(12) United States Patent
Kim

(10) Patent No.: US 7,139,568 B2
(45) Date of Patent: Nov. 21, 2006

(54) METHOD AND SYSTEM FOR MOBILE NUMBER PORTABILITY SERVICE

(75) Inventor: Hyung-Jo Kim, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 151 days.

(21) Appl. No.: 10/654,458

(22) Filed: Sep. 4, 2003

(65) Prior Publication Data

US 2004/0053610 A1    Mar. 18, 2004

(30) Foreign Application Priority Data

Sep. 13, 2002  (KR) ...................... 10-2002-0055689

(51) Int. Cl.
*H04M 7/00*   (2006.01)
(52) U.S. Cl. .................. 455/432.1; 455/433; 455/551; 455/443; 455/461; 455/445
(58) Field of Classification Search ................ 455/433, 455/435.1, 422.1, 432.1, 445, 456.1; 379/221.13
See application file for complete search history.

(56) References Cited

U.S. PATENT DOCUMENTS 5,890,063 A * 3/1999 Mills ........................... 455/433
6,064,887 A * 5/2000 Kallioniemi et al. ....... 455/445
6,138,026 A   10/2000 Irvin ........................... 455/456
6,240,293 B1  5/2001 Koster ......................... 455/445
6,266,405 B1  7/2001 Madour et al. ............. 379/207
6,266,517 B1  7/2001 Fitzpatrick ................... 455/114
6,424,832 B1  7/2002 Britt et al. .................. 455/432
6,466,556 B1 * 10/2002 Boudreaux .................. 370/331

* cited by examiner

*Primary Examiner*—Lester Kincaid
*Assistant Examiner*—Muthuswamy G. Manoharan
(74) *Attorney, Agent, or Firm*—Fleshner & Kim LLP.

(57) ABSTRACT

A system and method for mobile number portability service in an asynchronous mobile communication network is provided. The system stores changes in mobile service providers and an address of a Network Provider Database (NPDB) in the service network which is presently providing the mobile subscriber with mobile service. By performing a mobile number portability inquiry only for a mobile subscriber who has changed his mobile service provider can be processed by the NPDB in the service network presently providing the mobile subscriber with mobile service, thus reducing the number of NPDBs required and improving system performance.

11 Claims, 7 Drawing Sheets

METHOD AND SYSTEM FOR MOBILE NUMBER PORTABILITY SERVICE

BACKGROUND OF THE INVENTION

1. Field of the Invention

The present invention relates to a method and system for mobile number portability (MNP) service in an asynchronous mobile communication network and, in particular, to a method and system of which performance is improved by storing whether mobile subscriber changed his mobile service provider and an address of a Number Portability Database (NPDB) in a service network where the mobile subscriber gets to subscribe and by performing mobile number portability inquiry, in the NPDB using the address, only for a mobile subscriber who practically changed his mobile service provider.

2. Description of the Related Art

Generally, the MNP service supports mobile subscribers to change mobile service provider without changing their mobile station number (Hereinafter, "mobile number") and is specifically described in 3rd Generation Partnership Project (3GPP) Technical Specifications (TS) 23.066 Support of MNP Technical Realization Phase 2.

When a mobile service provider provides a mobile subscriber with mobile service at first, the mobile service provider provides the mobile subscriber with Mobile Subscriber Identification Number (MSIN) and Mobile Station Integrated Service Digital Network (ISDN) Number (MSISDN).

The MSIN is a number for identifying mobile subscribers, used by a mobile service provider, and the MSISDN is a mobile number of a mobile subscriber.

If a mobile subscriber wants to change his mobile service provider, the mobile subscriber should abandon the MSISDN given by a previous mobile service provider and receive a new MSISDN from a new mobile service provider.

To change MSISDN is too complicated and causes uncomfortable-ness that a mobile subscriber informs people, who know the previous MSISDN, of the new MSISDN again.

Accordingly, it is comfortable that a mobile subscriber is able to use a previous MSISDN in spite of change of a mobile service provider.

The MNP service enables mobile subscribers to use same MSISDN in spite of change of mobile service provider and there are Terminating call Query on Digit analysis (TQoD) method and Query on HLR Release (QoHR) method in systems providing the MNP service.

First, MNP service network according to the TQoD method, as illustrated in attached FIG. 1, includes: an originating network 10 attempting calls; a previous service network 20 terminating calls until a mobile subscriber changed his mobile service provider; and a current service network 30 where the mobile subscriber presently subscribes. The previous network 20 includes, as components for providing the MNP service: a Gateway Mobile Switching Center (GMSC) 21 that processes call processing between networks; and an NPDB 22 where information of the mobile subscriber, who changed his mobile service provider, is stored.

Nodes are connected through intelligent network protocol messages. ITU-T SS7 ISUP protocol is used between the originating network 10 and the GMSC 21 or between the GMSC 21 and the current service network 30. 3GPP Customer Application for Mobile Network Enhanced Logic (CAMEL) protocol is used between the GMSC 21 and the NPDB 22, for controlling details and processing messages.

Second, MNP service network according to the QoHR method, as illustrated in attached FIG. 2, includes: an originating network 10 attempting calls; a previous service network 20 terminating calls until a mobile subscriber changed his mobile service provider; and a current service network where the mobile subscriber presently subscribes. The previous network 20 includes, as components for providing the MNP service: a GMSC 21 that processes call processing between networks; an NPDB 22 where information of the mobile subscriber, who changed his mobile service provider, is stored; an HLR 23 where location or general information of the mobile subscriber is stored.

ITU-T SS7 ISUP (ISDN User Part) protocol is used for connecting the originating network 10 and the GMSC 21 or connecting the GMSC 21 and the current service network 30. 3GPP Mobile Application Part (MAP) protocol is used for connecting the GMSC 21 and the HLR 23. 3GPP CAMEL protocol is used for controlling details and processing messages between the GMSC 21 and the NPDB 22.

The NPDB, one of components making up the MNP service network, includes an MNP service logic supporting multiple protocols; and an MNP routing table corresponding to each MNP service logic. When an inquiry message is inputted from the GMSC, the NPDB analyzes a protocol applied to the inquiry message and, then, pages MNP service logic corresponding to the protocol. The MNP service logic obtains routing information about called subscriber from the MNP routing table by using mobile number of the called subscriber as service key.

Then, the NPDB transfers the obtained routing information to the GMSC, using the same protocol as the protocol used for the inquiry message.

Hereinafter, the MNP service in the above-mentioned network will be described in detail with reference to attached drawings. First, in the MNP service according to the TQoD method, as illustrated in FIG. 3, call originated from the originating network 10 transfers an MSISDN of a called subscriber to the GMSC 21 in the previous service network 20, with loading the MSISDN of the called subscriber on an ISUP_Initial Address Message (IAM) according to ITU-T SS7 ISUP protocol (S301), since it is determined that the mobile subscriber still uses previous mobile number as a result of translating mobile number.

Then, the GMSC 21 transfers the MSISDN of the called subscriber to the NPDB 22, with loading the MSISDN, received from the originating network 10, on the CAMEL_Initial Detection Point (IDP) message according to 3GPP CAMEL protocol, in order to request mobile number portability inquiry (S302).

If a mobile subscriber subscribes to another service network and mobile number of the mobile subscriber is changed, the NPDB 22 transfers a routing number of the mobile subscriber, an actual called number given to the called subscriber by the current service network 30, to the GMSC 21, with loading the routing number on CAMEL_CONNECT message according to 3GPP CAMEL protocol (S303).

The GMSC 21 translates the routing number loaded on the received CAMEL_CONNECT message and, then, transfers the routing number to the current service network 30, with loading the routing number on ISUP_IAM according to ITU-T SS7 ISUP protocol (S304). Then, a call is connected to the called subscriber in the current service network 30 according to a mobile call processing procedure.

Second, as illustrated in FIG. 4, in the MNP service according to the QoHR method, a call originated from the originating network 10 transfers an MSISDN of a called subscriber to the GMSC 21 in the previous service network 20 for call connection request, with loading the MSISDN on ISUP_IAM according to ITU-T SS7 ISUP protocol (S401), since it is determined that the mobile subscriber still uses a previous mobile number as a result of translating mobile number.

The GMSC 21 transfers the MSISDN to the HLR 23, in order to inquire about called subscriber information, with loading the MSISDN on MAP_Send Routing Information (SRI) message, which is mobile subscriber information inquiry request message according to 3GPP MAP protocol.

However, the HLR 23, which does not have the subscriber information due to the mobile subscriber's change of mobile service provider, transfers 3GPP MAP_SRI_Negative Response (NRP) message, information inquiry failure response message according to 3GPP MAP protocol, with 'INVALID SUBSCRIBER' sign to the GMSC (21) (S403).

The GMSC 21 which received the MAP_SRI_NRP message, in order to inquire about mobile number portability of the called subscriber, transfers the MSISDN to the NPDB 22 in the previous service network 20, with loading the MSISDN on the CAMEL_IDP message, mobile number portability request message according to 3GPP CAMEL protocol (S404).

The NPDB 22 transfers a routing number of the mobile subscriber, an actual called number given to the called subscriber by the current service network 30, to the GMSC 21 by loading the routing number on the CAMEL_CONNECT message according to 3GPP CAMEL protocol (S405).

The GMSC 21 translates the routing number loaded on the received CAMEL_CONNECT message and, then, transfers the routing number to the current service network 30 by loading the routing number on the ISUP_IAM according to ITU-T SS7 ISUP protocol (S406). Then, the call is connected to the called subscriber in the current service network 30 according to a mobile call processing procedure.

The MNP service of the related art has a problem in that NPDB server corresponding to the number of service networks has to be provided in every service network cooperating with one current service network for MNP service.

More specifically, one routing number management server allotting a routing number and N-1 mobile number portability inquiry server inquiring about mobile number portability of a called subscriber, have to be provided in each N service network.

According to the MNP service of TQoD method, mobile number portability inquiry about all mobile subscribers is performed in the NPDB, so that even a call for a mobile subscriber who does not change his mobile service provider has to go through the mobile number portability inquiry in the NPDB, thereby declining system performance.

According to the MNP service of QoHR method, it has an advantage in that system performance is improved, compared with TQoD method, because mobile number portability inquiry in an NPDB is performed only for a mobile subscriber, whose location information inquiry is failed. However, it still has a problem in system performance because mobile number portability inquiry in an NPDB is performed for all cases where the location information inquiry is failed and the called subscriber is determined as 'INVALID SUBSCRIBER'.

SUMMARY OF THE INVENTION

The present invention is to solve the above-described problems and an object of the present invention is to store whether a mobile subscriber changed his mobile service provider and information of an address of an NPDB in the service network presently providing the mobile subscriber with mobile service (Hereinafter, 'current service network') in MNP service system located in the service network previously providing the mobile subscriber with mobile service (Hereinafter, 'previous service network'). Another object of the present invention is to perform mobile number portability inquiry in the NPDB in the current service network only for a mobile subscriber who practically changed his mobile service provider using the information stored in the MNP service system.

In order to achieve at least the above objects, in whole or in parts, there is provided a method for mobile number portability service that mobile number portability information for a mobile subscriber who changed his service provider is stored in an HLR and the HLR responds to location information inquiry for the mobile subscriber by transferring the mobile number portability information.

Preferably, the mobile number portability information is a mobile number portability indicator indicating that the mobile subscriber changed his mobile service provider and an address of the NPDB in the service network where the mobile subscriber presently subscribes.

Differently, another method for mobile number portability service includes: obtaining mobile number portability information of a mobile subscriber who changed his mobile service provider through location information inquiry; obtaining a routing number of the mobile subscriber by using the mobile number portability information; and connecting a call with the mobile subscriber by using the routing number.

Preferably, said obtaining mobile number portability information includes: requesting information inquiry for location of the mobile subscriber and performing the information inquiry for location of the mobile subscriber in an HLR; and transferring the mobile number portability information of the mobile subscriber, stored in the HLR, from the HLR to a GMSC in a previous service network in response to the request.

Preferably, said obtaining a routing number of the mobile subscriber by using the mobile number portability information includes: checking address of an NPDB in a service network where the mobile subscriber presently subscribes (Hereinafter, "current service network") among the mobile number portability information; and obtaining a routing number of the mobile subscriber by performing routing information inquiry in the NPDB.

Preferably, said connecting a call with the mobile subscriber by using the routing number includes: requesting call termination to the GMSC in the current service network using the obtained routing number; and terminating the call to the mobile subscriber using the routing number.

Preferably, a system for mobile number portability service according to one preferred embodiment of the present invention includes: an HLR for storing address of an NPDB in a current service network and responding the address of the NPDB in response to request of information for the mobile subscriber's location; and a GMSC for receiving the address of the NPDB by requesting the information for the mobile subscriber's location to the HLR when receiving request of call termination to the mobile subscriber, for receiving a routing number of the mobile subscriber by inquiring about routing information in the NPDB and for requesting the call termination to the current service network.

DETAILED DESCRIPTION OF THE PREFERRED EMBODIMENT

Hereinafter, a detailed explanation will be given as to the preferred embodiment of the present invention with reference to the attached drawings.

Figure 1:
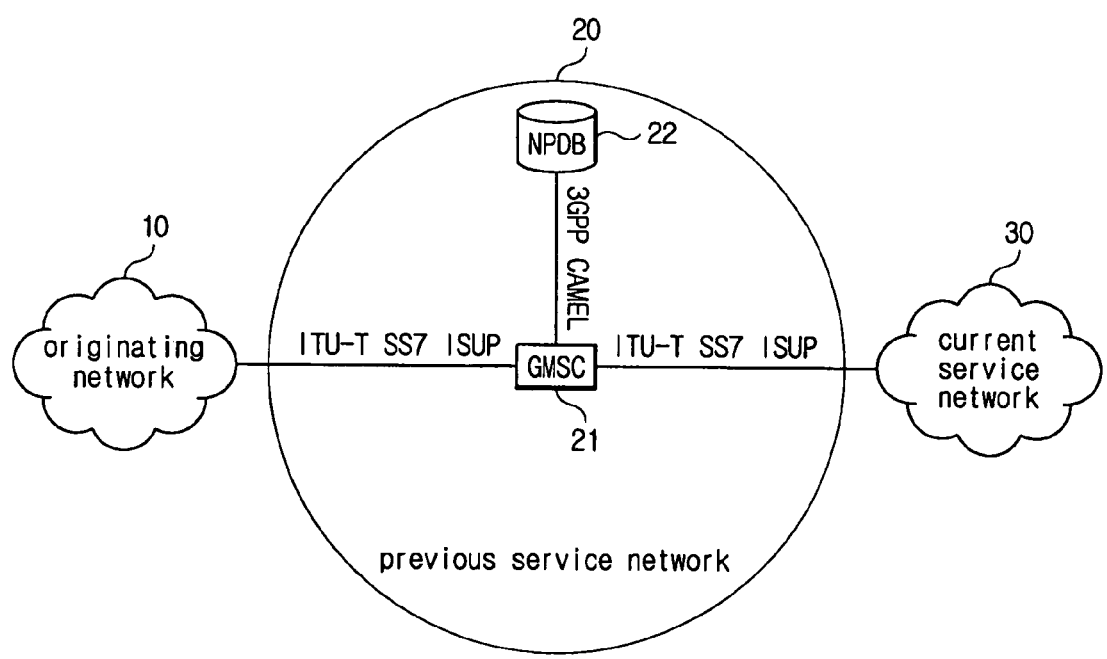
FIG. 1 illustrates configuration of service networks for MNP service according to TQoD method in the related art.
Figure 2:
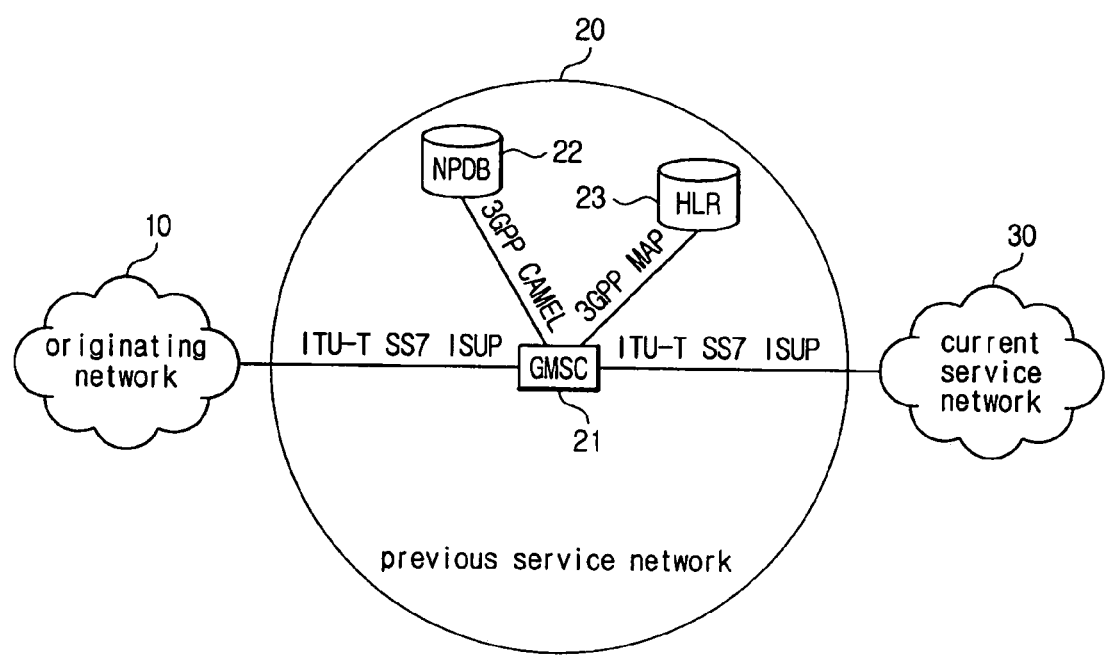
FIG. 2 illustrates configuration of service networks for MNP service according to QoHR method in the related art.
Figure 3:
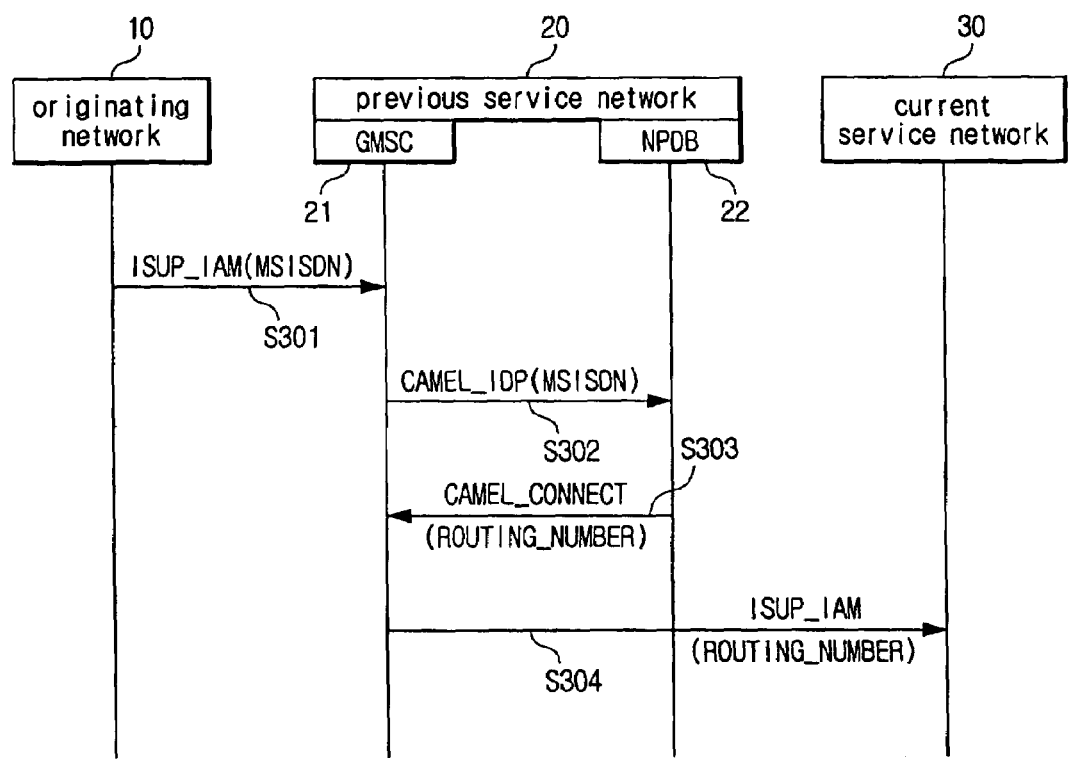
FIG. 3 illustrates signal flows in the service networks illustrated in FIG. 1.
Figure 4:
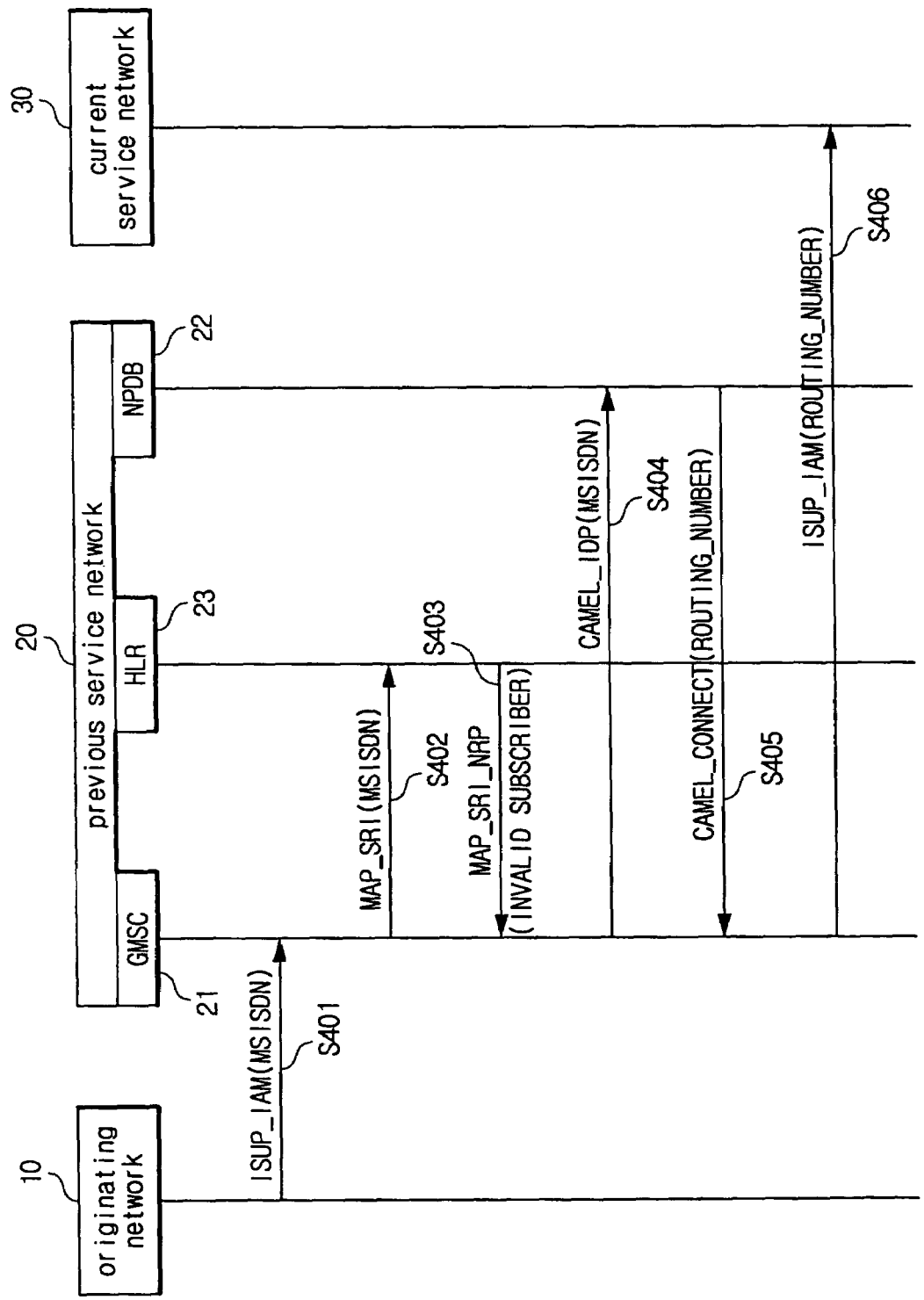
FIG. 4 illustrates signal flows in the service networks illustrated in FIG. 2.
Figure 5:
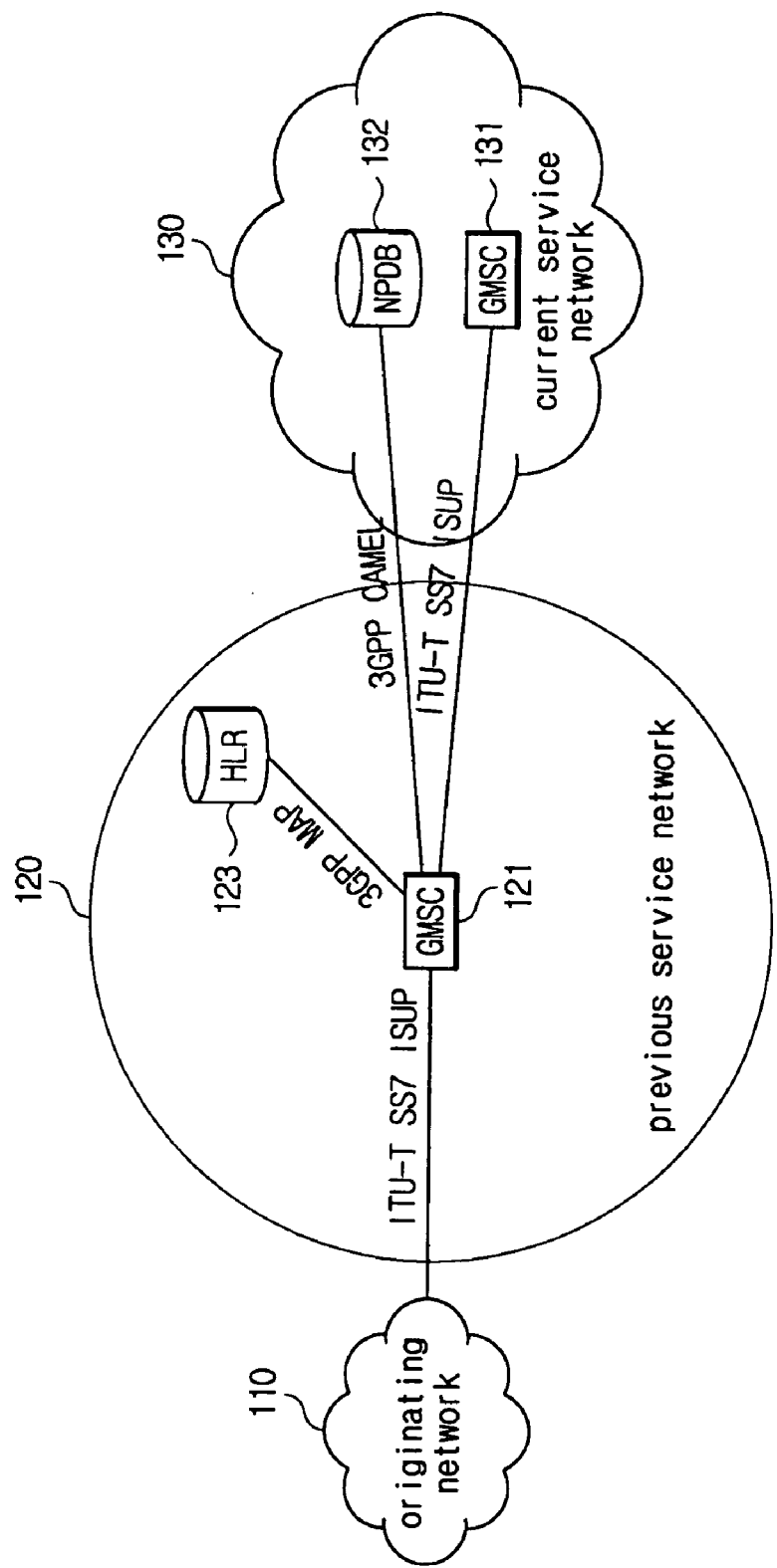
FIG. 5 illustrates configuration of service networks for MNP service according to one preferred embodiment of the present invention.

MNP service according to the preferred embodiment of the present invention is performed, as illustrated in FIG. 5, through an originating network 110 attempting a call; a previous service network 120 where terminating a call until a mobile subscriber changed his mobile service provider; and a current service network 130 where the mobile subscriber presently subscribes.

MNP service system in the previous service network 120 includes, as components for providing the MNP service: a GMSC 121 that processes call processing between service networks; and an HLR 123 where mobile number portability information, the mobile subscriber's location or general information of the mobile subscriber, is stored. The MNP service system in the previous service network 120 cooperates with a GMSC 131 in the current service network 130 that processes call processing between service networks; and an NPDB 132 where information of a mobile subscriber who changed his mobile service provider is stored.

ITU-T SS7 ISUP protocol is used for connecting the GMSC 121 and the GMSC 131. 3GPP MAP protocol is used for connecting the GMSC 121 and the HLR 123. 3GPP CAMEL protocol is used for controlling details and processing messages between the GMSC 121 and the NPDB 132.

Figure 6:
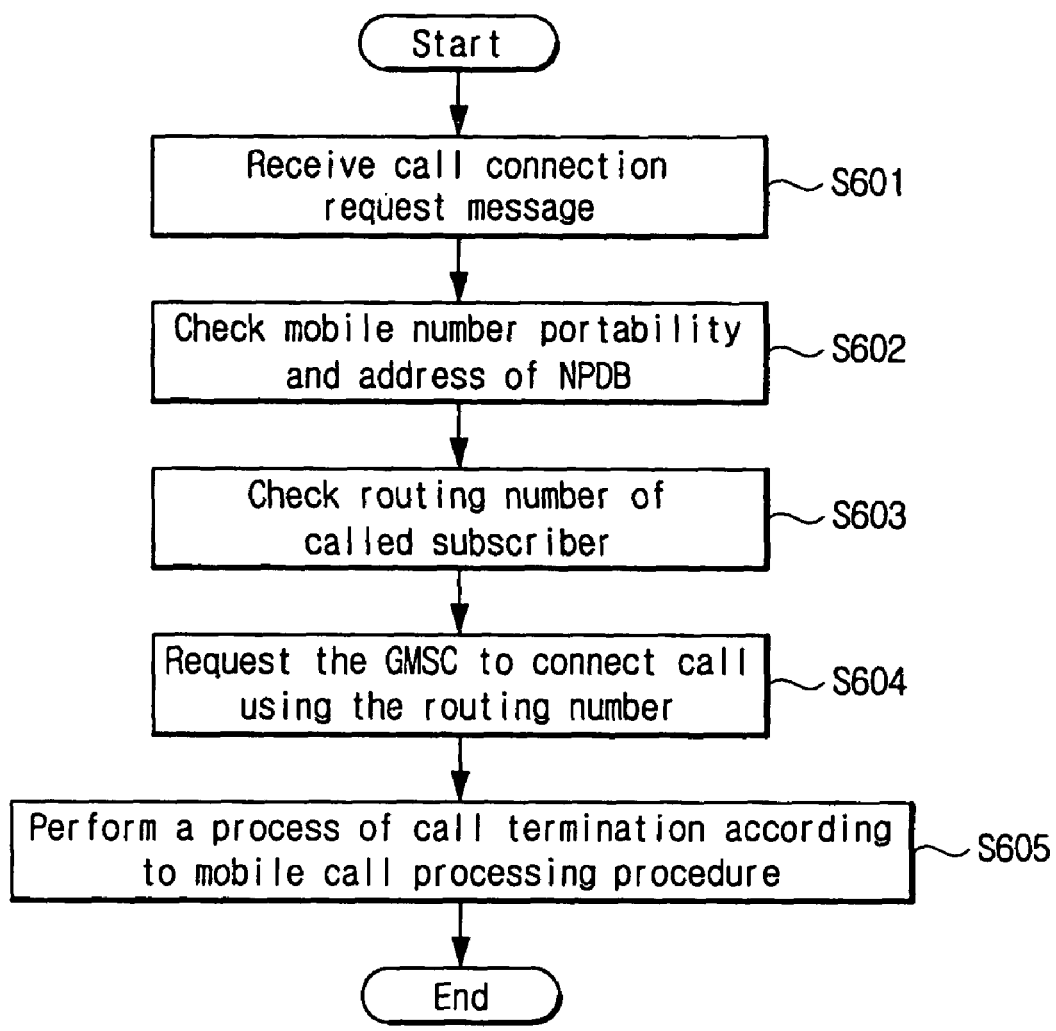
FIG. 6 is a flow chart illustrating operations in the MNP service system illustrated in FIG. 5.

FIG. 6 is a flow chart illustrating operations in the MNP service system illustrated in FIG. 5. The GMSC 121 receives call connection request message from the originating network 110 (S601). The GMSC 121 checks whether the called subscriber changed his mobile service provider and address of NPDB 132 in the current service network 130 by inquiring about information of the called subscriber in the HLR 123 (S602).

The GMSC 121 checks a routing number of the called subscriber by inquiring mobile number portability of the called subscriber in the NPDB 132 of which address is checked (S603) and, then, requests the GMSC 131 in the current service network to connect a call using the routing number (S604).

Then, the GMSC 131 performs a process of call termination to the called subscriber according to mobile call processing procedure (S605).

Figure 7:
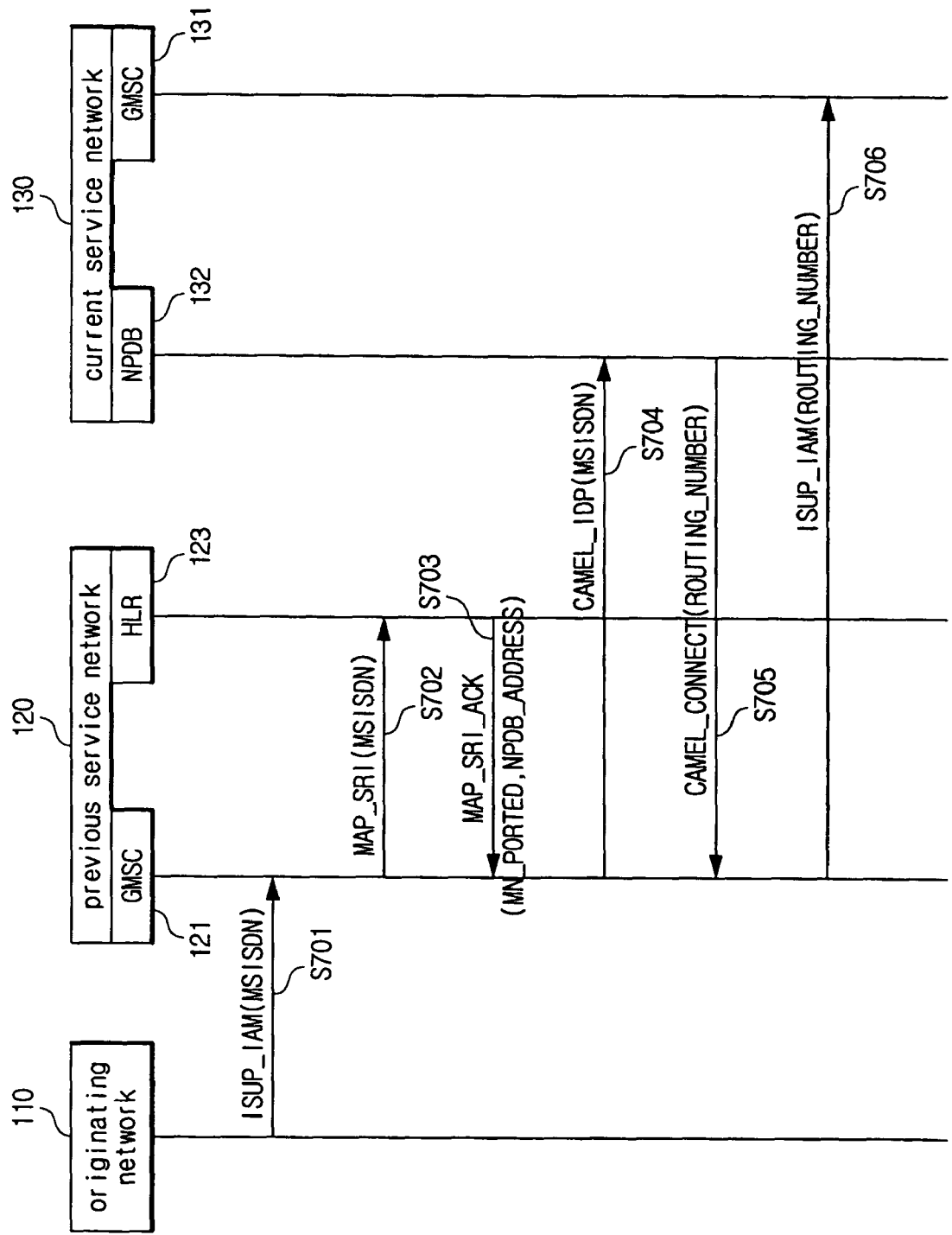
FIG. 7 illustrates operations in the MNP service system illustrated in FIG. 5.

FIG. 7 illustrates operations in the MNP service system illustrated in FIG. 5. Because a call originated from the originating network 110 still uses a previous number of the called subscriber when translating number of the called subscriber, an MSISDN is transferred to the GMSC 121 in the previous service network 120, in order to request call connection to the previous service network, with loading the MSISDN on an ISUP_IAM, which is ITU-T SS7 ISUP protocol message (S701).

Then, the GMSC 121 transfers the MSISDN to the HLR 123 in the previous service network, for called subscriber information inquiry, with loading the MSISDN on a MAP_SRI message, which is 3GPP_MAP protocol message (S702).

The HLR 123 stores a mobile number portability indicator, indicating that mobile number is changed because the called subscriber changed his mobile service provider, and address of the NPDB 132 in the current service network 130. Thus, the HLR 123 transfers the mobile number portability indicator MN_PORTED and the address of the NPDB 132 NPDB_ADDRESS to the GMSC 121, with loading the mobile number portability indicator MN_PORTED and the address of the NPDB 132 NPDB_ADDRESS on a MAP_SRI_ACK message, which is a 3GPP_MAP protocol response message (S703).

The GMSC 121 transfers the MSISDN of the called subscriber to the NPDB 132 in the current service network 130, for the called subscriber's mobile number portability inquiry, with loading the MSISDN of the called subscriber on a CAMEL_IDP message, which is 3GPP_CAMEL protocol message (S704).

The NPDB 132 in the current service network 130 that received the mobile number portability inquiry request from the GMSC 121 transfers a routing number of the called subscriber who changed his mobile service provider ROUTING_NUMBER to the GMSC 121 in the previous service network 120, with loading the routing number ROUTING_NUMBER on a CAMEL_CONNECT message according to 3GPP_CAMEL protocol (S705). The GMSC 121 in the previous service network 120 translates the routing number and, then, transfers the routing number to the GMSC 131 in the current service network 130, with loading the routing number on an ISUP_IAM according to ITU-T SS7 ISUP protocol (S706). Subsequently, the call is connected to the called subscriber according to a mobile call processing procedure in the current service network.

Like above, according to the preferred embodiment of the present invention, whether a called subscriber changed his mobile service provider and information of address of NPDB in the current service network are stored in the previous service network and mobile number portability inquiry in the NPDB in the current service network is performed only for a called subscriber, who practically changed his mobile service provider. Thus, it has advantages in that system performance is improved and the number of NPDB, which should be provided as many as the number of service networks in the related art, can be reduced into one NPDB.

The foregoing embodiments and advantages are merely exemplary and are not to be construed as limiting the present invention. The present teaching can be readily applied to other types of methods. The description of the present invention is intended to be illustrative, and not to limit the scope of the claims. Many alternatives, modifications and variations will be apparent to those skilled in the art.

What is claimed is:

1. A method for providing mobile number portability service, comprising:
   storing mobile number portability information for a mobile subscriber, who has transferred mobile service from a first mobile service network to a second mobile service network, in a Home Location Register (HLR) associated with the first mobile service network;
   requesting network address information associated with a Network Provider Database (NPDB) of the second mobile service network from the HLR associated with the first mobile service network;
   receiving the requested network address associated with the NPDB of the second mobile service network and requesting a routing number associated with an MSISDN of the mobile subscriber from the NPDB of the second mobile service network;
   receiving the routing number from the NPDB and translating the routing number in a Gateway Mobile Switching Center (GMSC) of the first mobile service network; and
   requesting the second mobile service provider to connect a call forwarded from the first mobile service network to the mobile subscriber through a GMSC of the second mobile service network based on the translated routing number, wherein the first mobile service network is associated with a first mobile service provider, and the second mobile service network is associated with a second mobile service provider.

2. The method of claim 1, wherein storing mobile number portability information comprises storing a mobile number portability indicator indicating that the mobile subscriber has changed mobile service networks.

3. The method of claim 2, wherein the mobile number portability indicator includes the network address of NPDB of the second mobile service network.

4. A method for providing mobile number portability service, comprising:
   transmitting a location information inquiry to a Home Location Register (HLR) of a previous mobile service network, the HLR storing a network address of a Network Provider Database (NPDB) associated with a current mobile service network;
   receiving, from the HLR, the address of the NPDB and mobile number portability information associated with a mobile subscribers, who has moved from the previous mobile service network to the current mobile service network;
   obtaining a routing number associated with an MSISDN of the mobile subscriber from the Network Provider Database (NPDB) of the current mobile service network using the mobile number portability information and the address of the NPDB;
   translating the routing number in a Gateway Mobile Switching Center (GMSC) of the previous mobile service network; and
   connecting a call to the mobile subscriber through a GMSC of the current mobile service network using the translated routing number, wherein the previous mobile service network is associated with a first mobile service provider and the current mobile service network is associated with a second mobile service provider.

5. The method of claim 4, wherein the mobile number portability information includes a mobile number portability indicator indicating that the mobile subscriber has moved from the previous mobile service network to the current mobile service network.

6. The method of claim 5, wherein the mobile number portability indicator includes the network address of the NPDB of the current mobile service network.

7. The method of claim 4, further comprising:
   storing the mobile number portability information in a Home Location Register (HLR) associated with the previous mobile service network that also stores information indicating an address in the NPDB where the routing number associated with the mobile subscriber is stored.

8. The method of claim 4, and further comprising:
   transferring the mobile number portability information stored in the HLR associated with the previous mobile service network from the HLR to the Gateway Mobile Switching System (GMSC) of the previous mobile service network in response to the inquiry.

9. The method of claim 4, wherein connecting a call to the mobile subscriber using the routing number comprises:
   submitting a call termination request to the Gateway Mobile Switching Center (GMSC) associated with the current mobile service network using the obtained routing number; and
   terminating the call to the mobile subscriber using the routing number.

10. A mobile number portability service system, comprising:
    a Home Location Register (HLR) for storing an address of a Network Provider Database (NPDB) associated with a current service network, and for providing the address of the NPDB in response to a request for information related to a mobile subscriber's location; and
    a first Gateway Mobile Switching Center (GMSC) for requesting the information related to the mobile subscriber's location from the HLR and receiving the address of the NPDB request, for requesting routing information from the NPDB and receiving a routing number associated with the mobile subscriber, and for requesting call termination from the current service network, wherein the NPDB is configured to provide a routing number associated with a mobile subscriber in the current service network based on a MSISDN associated with the mobile subscriber, and
    wherein the first GMSC is part of a previous service network and is configured to review the routing number from the NPDB which is part of the current service network, to translate the routing number from the NPDB which is part of the current service network, and to connect a call to the mobile subscriber through a second GMSC which is part of the current service network, and wherein the first service network is associated with a first mobile service provider and the second service network is associated with a second mobile service provider.

11. The system of claim 10, wherein the HLR in which the address of the NPDB is stored is part of a previous service network to which the mobile subscriber previously subscribed.

* * * * *